March 11, 1958 J. G. PONT ET AL 2,825,920
WINDSHIELD WIPER
Filed Sept. 20, 1954 3 Sheets-Sheet 3
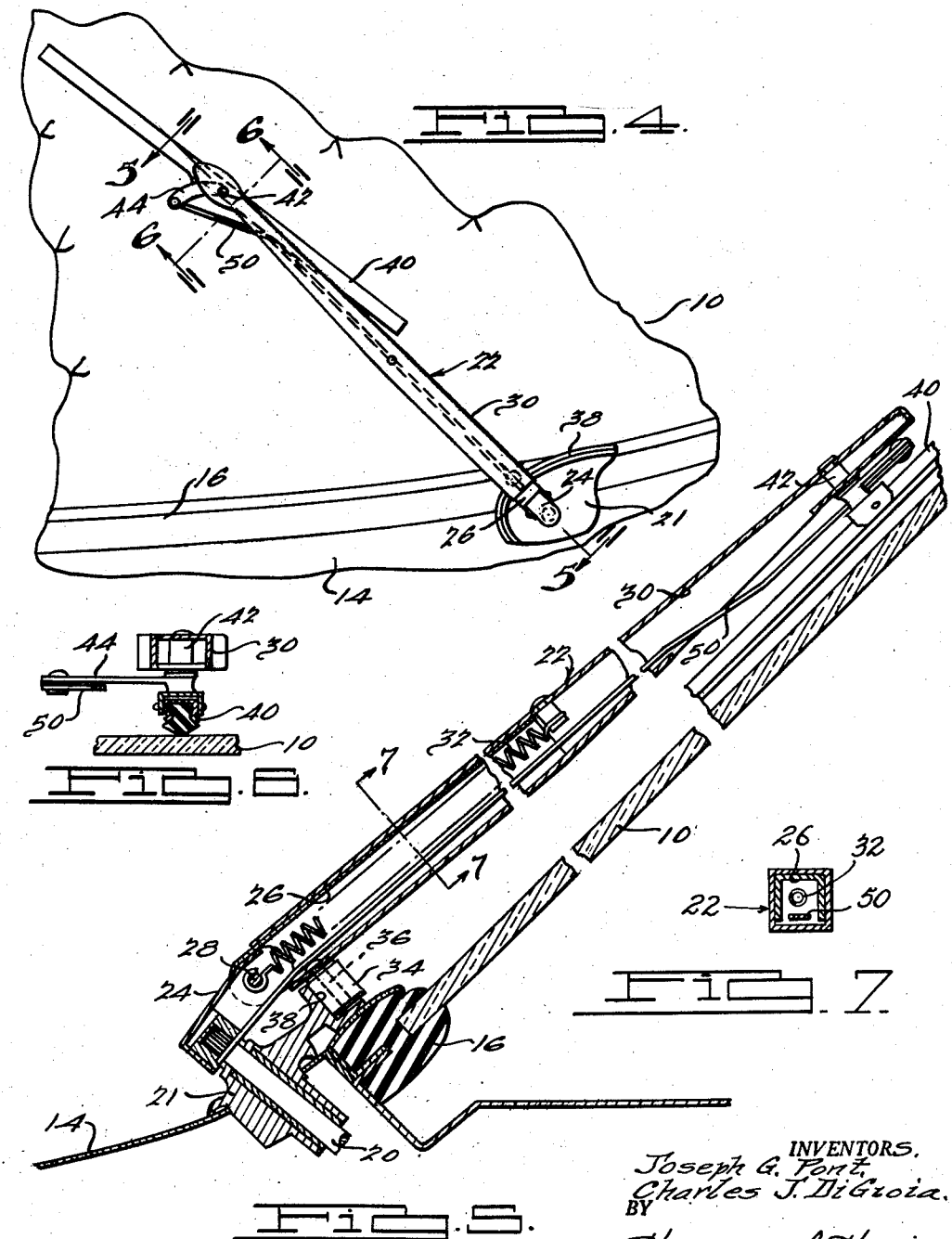
INVENTORS.
Joseph G. Pont,
Charles J. DiGioia.
BY
Harness and Harris
ATTORNEYS.

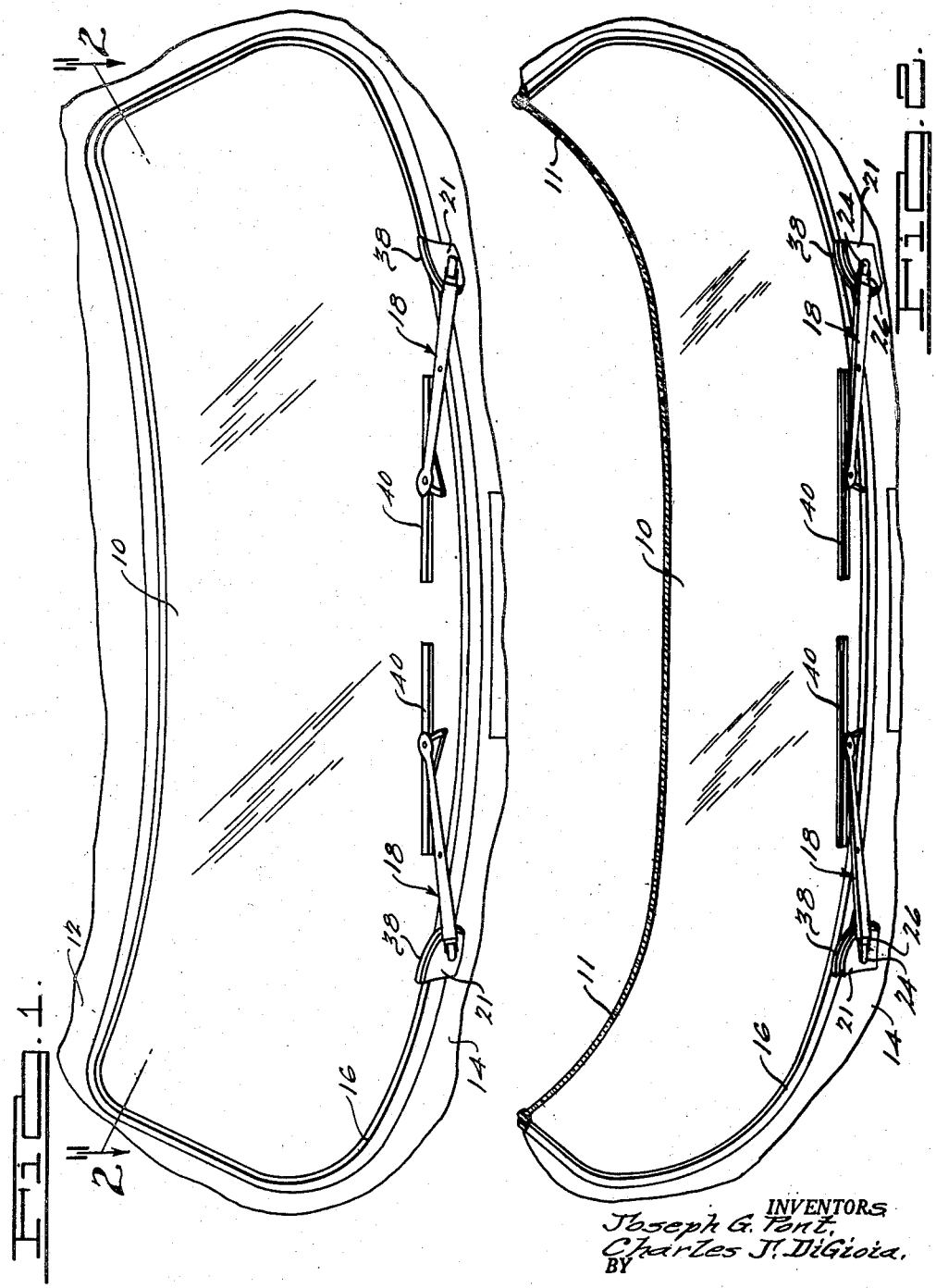

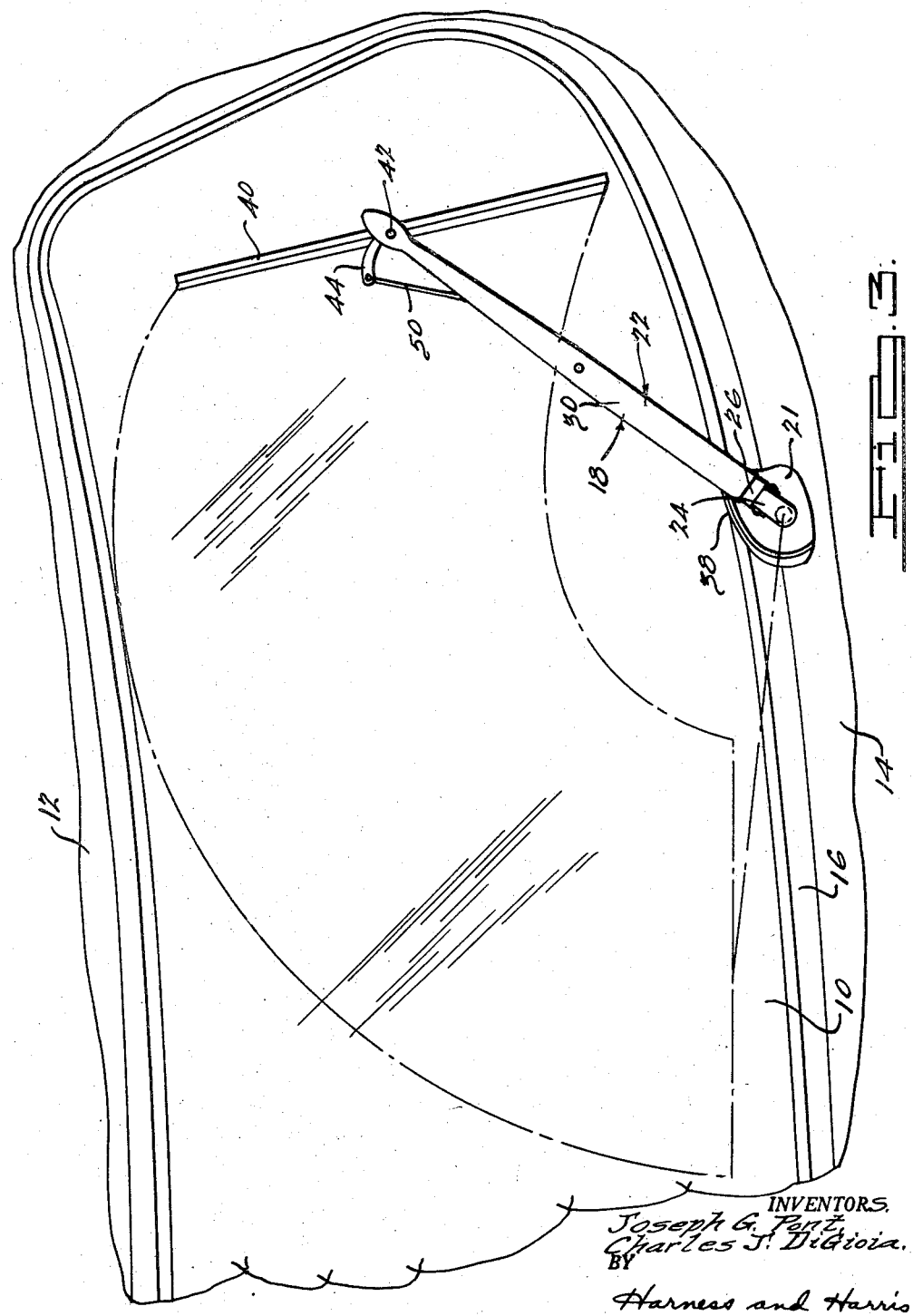

United States Patent Office 2,825,920
Patented Mar. 11, 1958

2,825,920

WINDSHIELD WIPER

Joseph G. Pont and Charles J. Di Gioia, Detroit, Mich., assignors to Chrysler Corporation, Highland Park, Mich., a corporation of Delaware Application September 20, 1954, Serial No. 457,154

8 Claims. (Cl. 15—255)

The present invention relates generally to windshield wipers for use in automobiles and the like and it relates more particularly to windshield wipers of the type in which a wiping blade is associated with the free end of a wiper arm that is pivotally mounted for oscillation so that the wiping blade is moved back and forth in an arcuate path across a portion of the windshield.

In the evolution of automobiles it has become common practice to utilize a pair of such wiping devices for each windshield. However, the recent trend in automobile design utilizes curved windshields of extreme width, with end portions of severe curvature that in effect wrap around the forward corners of the vehicle body and windshields of this type cannot have sufficient areas thereof satisfactorily wiped by the conventional wiping devices heretofore generally used on automobiles.

It is a principal object of our invention to provide a wiping mechanism that in addition to moving the wiping blade in an arcuate path provides controlled movement thereof including pivotal movement of the blade relative to the wiper arm and further provides means to elongate and retract the wiper arm during each oscillation thereof to vary the effective radius of the wiper arm.

Our wiping mechanism is particularly adapted for use with windshields of the type which although they have severe curvatures in horizontal sections thereof have substantially straight line contour in vertical sections of the windshield. The pivotal movement of the blade relative to the arm which has been referred to herein is controlled in an effort to keep the wiper blade substantially parallel with the straight line sections of the windshield in the areas of severe curvature of the windshield.

It is a further object of the invention to increase the wiped area by slightly elongating the effective radius of the wiper arm during a portion of the wiping stroke of the wiper blade. It is desirable to provide mechanism for accomplishing this for the upper edge of the windshield is a limiting factor on the length of wiper arm and wiper blade that can be moved over the windshield without interference with the upper edge thereof while a long effective wiper arm is desirable at the outer limits of the wiper stroke to reach as far as possible toward the outer and upper extremities of the windshield.

In the drawings:

Fig. 1 is a front elevational view of a portion of an automobile equipped with our novel windshield wiper;

Fig. 2 is a horizontal section taken on the line 3—3 of Fig. 1;

Fig. 3 is a fragmentary elevational view showing our windshield wiper at the position corresponding to the outer edge of its wiper pattern with the wiper arm in its elongated condition;

Fig. 4 is a fragmentary front elevational view similar to Fig. 3 and showing the windshield wiper in an intermediate position with the wiper arm in its retracted condition;

Fig. 5 is a section taken on the line 5—5 of Fig. 4;

Fig. 6 is a section taken on the line 6—6 of Fig. 4; and

Fig. 7 is a section taken on the line 7—7 of Fig. 5.

The portion of an automobile which is illustrated in Fig. 1 includes a windshield 10 which is curved as illustrated in Fig. 2 and it will be noted that the windshield 10 is extremely wide and has end portions 11 of severe curvature that wrap around the forward corners of the vehicle body. Windshields of this type are currently being used on some motor vehicles. The automobile body in which the windshield 10 is mounted includes a roof 12 and a cowl 14 and conventional weatherstripping 16 is provided around the periphery of the windshield. It is contemplated that a pair of windshield wiping devices 18 be used in combination with windshield 10 to respectively wipe left and right portions thereof although our description herein will be of one such device 18.

A drive shaft 20 projects outwardly of the cowl 14 as shown in Fig. 5 and is journalled in a cowl supported member 21. To this extent the shaft 20 corresponds to shafts which are currently in general use on automobiles and it is to be understood that this shaft is driven by suitable linkage connecting it to a source of power such as a vacuum motor or an electric motor all as is generally known in the art. Shaft 20 is adapted to be oscillated so that a wiping blade to be described herein is moved back and forth in an arcuate path across a portion of the windshield.

A wiper arm 22 is formed of a plurality of relatively extensible sections. The wiper arm 22 includes a hub portion 24 which is keyed to drive shaft 20 for oscillation therewith. An arm section 26 is pivotally mounted on hub section 24 by means of a pin 28. The wiper arm hub section 24 and the wiper arm section 26 cooperate to define a first non-extensible portion of the wiper arm. The wiper arm also includes an outer section 30 which is telescopically received over the wiper arm section 26 and is adapted for longitudinal sliding movement relative to wiper arm section 26 to effect elongation and retraction of the wiper arm to vary the effective length thereof.

A spring 32 has one end secured to the wiper arm section 22 and the other end secured to the pin 28 to urge the wiper arm sections towards the retracted position. In addition, the spring 32 urges the wiper arm sections 26 and 30 clockwise about pin 28 to press the wiper arm and consequently the wiper blade carried on the end thereof inwardly toward the windshield.

The wiper arm section 30 carries a cam follower element 34 which is rotatably mounted on a pin 36 projecting outwardly from wiper arm section 30. The cowl supported member 21 is provided on its periphery with a cam surface 38 which is adapted to cooperate with the cam follower element 34 to urge wiper arm section 30 to extend relative to wiper arm section 26 to effect an elongation of the wiper arm.

A wiper blade 40 is pivotally mounted near the outer extremity of wiper arm section 30 by means of a pin 42 which is rotatably mounted in the wiper arm section 30. The wiper blade 40 may be of any commercial type which is adapted to flex to accommodate slight variations in windshield curvature and one suitable type of blade is shown in Anderson Patent 2,596,063. The means by which wiper 40 is carried on pin 42 may be any one of several detachable clip connections which are in current use on motor vehicles. For example, Anderson Patent 2,432,693 illustrates one form of such a connection. For simplicity the wiper blade has been illustrated as of extremely simple construction although it is to be understood that the flexible type of blade referred to above is preferred. For practical purposes and convenience in terminology the pin 42 and wiper blade 40 may be considered to be one assembly which will be referred to herein by the term wiper blade.

A laterally extending finger 44 is illustrated as carried by pin 42 although it is to be understood that the finger could be provided on the wiper blade 40 itself. As mentioned above, however, for convenience of terminology the finger 44 may be said to extend laterally from the wiper blade which includes the wiper blade proper 40 and the pin 42. The finger 44 serves as a lever to induce pivotal movement of wiper blade 40 about the axis of pin 42 when finger 44 is moved longitudinally relative to the wiper arm 22. In order to impart longitudinal movement to finger 44 a rod 50 is provided. The rod 50 has one end thereof connected to finger 44 in laterally spaced relationship to the pin 42 and the rod extends toward the drive shaft 20. The rod 50 is preferably hidden throughout a portion of its length by passing inside of the wiper arm 22. The lower extremity of the rod 50 is illustrated as secured to the drive shaft 20 although it is to be understood that it could be connected to any oscillating but non extensible portion of the windshield wiper mechanism, such as the hub portion 24 of the wiper arm or the wiper arm section 26. Connection of the lower end of rod 50 to either the hub portion 24 or wiper arm section 26 amounts to an operative connection of the rod 50 to the drive shaft 20 since the hub portion 24 and wiper arm section 26 are themselves operatively connected to drive shaft 20.

The rod is of fixed determinate length while the wiper arm 22 as described above is extensible and extension of the wiper arm 22 thus moves pin 42 radially relative to drive shaft 20 and the rod 50 limits corresponding movement of finger 44 so that the net result is a pivotal movement of the wiper blade 40 about the axis of pin 42 whenever a variation in length of the wiper arm 22 is imparted by the cam element 34 or the spring 32.

It will thus be seen that means have been provided to accommodate an extension of the wiper arm 22 when the wiper blade is in the outermost portion of its wiper pattern adjacent a wrap around portion 11 of the windshield 10. Simultaneously the elongation of the wiper arm causes the wiper blade to pivot relative to the wiper arm to more nearly maintain the blade in a vertical plane. This is beneficial because the windshield 10 has substantially straight sections in vertical directions and the more nearly that the wiper blade 40 stays to a vertical position at the outermost region of the wiping pattern where the windshield curvature is severe the more uniform will be the contact of the blade with the glass throughout the length of the wiper blade.

We claim:

1. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft being provided with relatively extensible sections adapted to accommodate elongation and retraction of said arm, means including a cam surface and cam follower responsive to oscillation of said shaft to effect elongation and retraction of said arm, and means extending between said blade and said shaft to pivot said blade relative to said arm as an incident to elongation and retraction of said arm.

2. A device for wiping a curved windshield mounted on the cowl of a motor vehicle; said device comprising a first member mounted on said cowl and provided with a bearing for an operating shaft, an operating shaft element pivotally mounted in said member, said member being provided with an external cam surface, a first arm element carried by said shaft element for oscillation therewith, a second arm section telescopically carried by said first arm element for longitudinal extension and retraction relative to said first arm element, a cam follower carried by said second arm section and adapted to follow said cam surface to extend said second arm section relative to said first arm element, spring means urging said second arm section toward a retracted position and thereby maintaining said cam follower element on said cam surface, a wiper blade pivotally mounted on the outer end of said second arm section, and connecting means operatively connecting said blade and one of said elements and operable to pivot said blade relative to said second arm section as an incident to extension of the latter.

3. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft being provided with relatively extensible sections adapted to accommodate elongation and retraction of said arm, means including a cam surface carried by a stationary portion of said vehicle, a cooperating cam follower carried by one of said sections and a return spring operatively connecting said sections, said means being responsive to oscillation of said shaft to effect elongation and retraction of said arm, and means extending between said blade and said shaft to pivot said blade relative to said arm as an incident to elongation and retraction of said arm.

4. A device for wiping a curved windshield of a vehicle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement about an axis which extends in a direction substantially normal to said glass, said arm intermediate said blade and said shaft being provided with relatively extensible sections adapted to accommodate elongation and retraction of said arm, means including a cam surface and cam follower responsive to oscillation of said shaft to effect elongation and retraction of said arm, a lever extending laterally from said axis adapted to induce pivotal movement of said blade about said axis in response to movement of said lever longitudinally of said arm, and means operatively connected to said lever and to said shaft to oscillate with said shaft and move said lever longitudinally relative to said arm as an incident to elongation and retraction of said arm.

5. A device for wiping a curved windshield of a vehicle comprising a drive shaft element journalled on a portion of the vehicle in the vicinity of a windshield margin, said shaft element being adapted to be oscillated, a wiper arm carried by said shaft for oscillation therewith and including a wiper arm element carried by said shaft element and extending laterally therefrom, a second wiper arm portion mounted on said wiper arm element for movement lengthwise of said arm relative to said wiper arm element, a cam carried by said second wiper arm portion, a cam surface carried by said vehicle in the vicinity of said drive shaft element, said cam being adapted to follow said cam surface during oscillation of said arm and said cam surface being adapted to move said cam and said second wiper arm portion outwardly to effect elongation of said wiper arm during oscillation of said wiper arm, a wiper blade pivotally mounted on said second wiper arm portion, and means providing a connection between said blade and one of said elements to effect a pivotal movement of said blade relative to said wiper arm as an incident to elongation of said wiper arm.

6. A device for wiping a curved windshield of a vehicle comprising a drive shaft journalled on a portion of the vehicle in the vicinity of a windshield margin, said shaft being adapted to be oscillated through repeated cycles including rotation in a first direction and return, an arm mechanism carried by said shaft for oscillation therewith, a wiper blade carried by said arm mechanism and mounted for pivotal movement relative thereto, said arm mechanism intermediate said blade and said shaft comprising a plurality of cooperating elements mounted for movement relative to each other to alter the effective radius of the arm mechanism, means operative to effect relative movement of said elements as an incident to each cycle of oscillation of said arm mechanism, said means including cooperating elements respectively carried by a stationary portion of said vehicle and by said arm mechanism, and means operatively connected to said blade and to said shaft to pivot said blade relative to said arm as an incident to relative movement of said arm elements.

7. A device for wiping a curved windshield of a vehicle comprising a drive shaft journalled on a portion of the vehicle in the vicinity of a windshield margin, said shaft being adapted to be oscillated through repeated cycles including rotation in a first direction and return, an arm mechanism carried by said shaft for oscillation therewith, a wiper blade carried by said arm mechanism and mounted for pivotal movement relative thereto, said arm mechanism intermediate said blade and said shaft being provided with relatively extensible sections adapted to accommodate elongation and retraction of said arm, one of said sections supporting said wiper blade and another of said sections being mounted on said shaft, means operative to effect relative extension and retraction of said sections as an incident to each cycle of oscillation of said arm mechanism, said means including cooperating elements respectively carried by a stationary portion of said vehicle and by said arm mechanism, and means operatively connected to said blade and to said oscillating assembly to pivot said blade relative to said arm as an incident to elongation and retraction of said arm.

8. A device for wiping a curved windshield of a vehivle comprising a drive shaft journalled on a portion of the vehicle in the vicinity of a windshield margin, said shaft being adapted to be oscillated, an arm carried by said shaft for oscillation therewith, a wiper blade carried by said arm and mounted for pivotal movement relative thereto, said arm intermediate said blade and said shaft being provided with relatively extensible sections adapted to accommodate elongation and retraction of said arm, one of said sections supporting said wiper blade and another of said sections being mounted on said shaft, means including a cam surface carried by a stationary portion of said vehicle and a cooperating cam follower carried by one of said sections to effect elongation and retraction of said arm in response to oscillation of said shaft, and means operatively connected to said blade and to said oscillating assembly to pivot said blade relative to said arm as an incident to elongation and retraction of said arm.

References Cited in the file of this patent
UNITED STATES PATENTS

| | | |
|---|---|---|
| 2,079,399 | Drew et al. | May 4, 1937 |
| 2,158,254 | Rosenberg | May 16, 1939 |
| 2,185,572 | Sawyer | Jan. 2, 1940 |
| 2,412,319 | Carey | Dec. 10, 1946 |